US009369414B2

(12) United States Patent
Klassen et al.

(10) Patent No.: US 9,369,414 B2
(45) Date of Patent: Jun. 14, 2016

(54) METHOD AND COMMUNICATION DEVICE FOR PROCESSING DATA FOR TRANSMISSION FROM THE COMMUNICATION DEVICE TO A SECOND COMMUNICATION DEVICE

(71) Applicant: BLACKBERRY LIMITED, Waterloo (CA)

(72) Inventors: Gerhard Dietrich Klassen, Waterloo (CA); Robert John Edwards, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

(21) Appl. No.: 14/670,600

(22) Filed: Mar. 27, 2015

(65) Prior Publication Data

US 2015/0200888 A1 Jul. 16, 2015

Related U.S. Application Data

(63) Continuation of application No. 13/217,360, filed on Aug. 25, 2011, now Pat. No. 9,002,928, which is a continuation of application No. 12/339,158, filed on Dec. 19, 2008, now Pat. No. 8,032,611.

(51) Int. Cl.
*G06F 15/16* (2006.01)
*H04L 12/58* (2006.01)
(Continued)

(52) U.S. Cl.
CPC .......... *H04L 51/08* (2013.01); *G06F 17/30876* (2013.01); *H04L 12/583* (2013.01); *H04L 51/063* (2013.01); *G06Q 50/01* (2013.01); *H04L 51/06* (2013.01); *H04L 51/14* (2013.01); *H04L 51/32* (2013.01); *H04M 1/72552* (2013.01)

(58) Field of Classification Search
CPC ......... H04L 51/08; H04L 51/32; H04L 51/14; H04L 51/06; H04L 51/063; H04M 1/72552; G06Q 50/01; G06F 17/30876
USPC ................................ 709/206, 203; 455/412.1
See application file for complete search history.

(56) References Cited

U.S. PATENT DOCUMENTS 8,032,611 B2 * 10/2011 Klassen ................ H04L 12/583
709/206
9,002,928 B2 * 4/2015 Klassen ................ H04L 12/583
709/203

(Continued)

OTHER PUBLICATIONS

Klassen, Gerhard Dietrich, et al., "Method and Communication Device for Processing Data for Transmission From the Communication Device to a Second Communication Device", U.S. Appl. No. 12/339,158, filed Dec. 19, 2008. Now U.S. Pat. No. 8,032,611, issued Oct. 4, 2011.

(Continued)

*Primary Examiner* — Jungwon Chang
(74) *Attorney, Agent, or Firm* — Perry + Currier, Inc.

(57) ABSTRACT

A method and communication device for processing data for transmission from the communication device to a second communication device is provided. It is detected that the data comprises an attachment. An address of a copy of the attachment is determined, the attachment present on a storage device external to the communication devices. An address of the copy of the attachment is substituted in the data such that the copy is retrievable at the second communication device via the address. The data is then transmitted to the second communication device.

19 Claims, 12 Drawing Sheets

(51) Int. Cl.
 *G06F 17/30* (2006.01)
 *H04M 1/725* (2006.01)
 *G06Q 50/00* (2012.01)

(56) References Cited

U.S. PATENT DOCUMENTS

| | | | |
|---|---|---|---|
| 2002/0016818 A1* | 2/2002 | Kirani | G06F 17/30902 709/203 |
| 2005/0188026 A1* | 8/2005 | Hilbert | H04L 12/58 709/206 |
| 2006/0085513 A1* | 4/2006 | Malik | G06Q 10/107 709/206 |
| 2007/0174402 A1* | 7/2007 | Tomkow | G06Q 10/107 709/206 |
| 2009/0005010 A1* | 1/2009 | Dote | H04L 12/585 455/412.1 |
| 2009/0089378 A1* | 4/2009 | Maresh | G06Q 10/107 709/206 |

OTHER PUBLICATIONS

Klassen, Gerhard Dietrich, et al., "Method and Communication Device for Processing Data for Transmission From the Communication Device to a Second Communication Device", U.S. Appl. No. 13/217,360, filed Aug. 25, 2011. Will issue as U.S. Pat. No. 9,002,928, issued Apr. 7, 2015.

* cited by examiner

METHOD AND COMMUNICATION DEVICE FOR PROCESSING DATA FOR TRANSMISSION FROM THE COMMUNICATION DEVICE TO A SECOND COMMUNICATION DEVICE

CROSS-REFERENCE TO RELATED APPLICATION

This application is a continuation of U.S. application Ser. No. 13/217,360, filed Aug. 25, 2011, which is a continuation of U.S. application Ser. No. 12/339,158 filed Dec. 19, 2008, the contents of each of which are incorporated herein by reference.

FIELD

Transmission of data between communication devices can require large amounts of bandwidth, especially if the data includes large attachments, such as images, videos, audio files, or documents. Such bandwidth can be costly, especially when the transmission occurs over wireless networks. This can occur, for example, when the communication device which originates the transmission includes a wireless communication device and/or a mobile communication device (laptop, cell phone, PDA, wireless modem, etc.). Furthermore, on wireless networks, the process of transmitting data is generally slow relative to wired networks. Hence, resources at an originating wireless communication device can be occupied with the transmitting process at the expense of other processes, often to the extent that the communication device can appear frozen until the transmission is complete. When transmitting data using a mobile communication device, operation of a radio is required. Such operation is power intensive and reduces the operational time of the mobile communication device due to reduction in power stored at the battery.

BACKGROUND

Furthermore, communication devices which receive transmitted data can have limits on the size of attachments which can be accepted, and data which has attachments that are of a size larger than the limit can be rejected, sometimes without the knowledge of a user of the receiving communication device.

BRIEF DESCRIPTIONS OF THE DRAWINGS

Embodiments are described with reference to the following figures, in which.

DETAILED DESCRIPTION OF THE EMBODIMENTS

Figure 1:
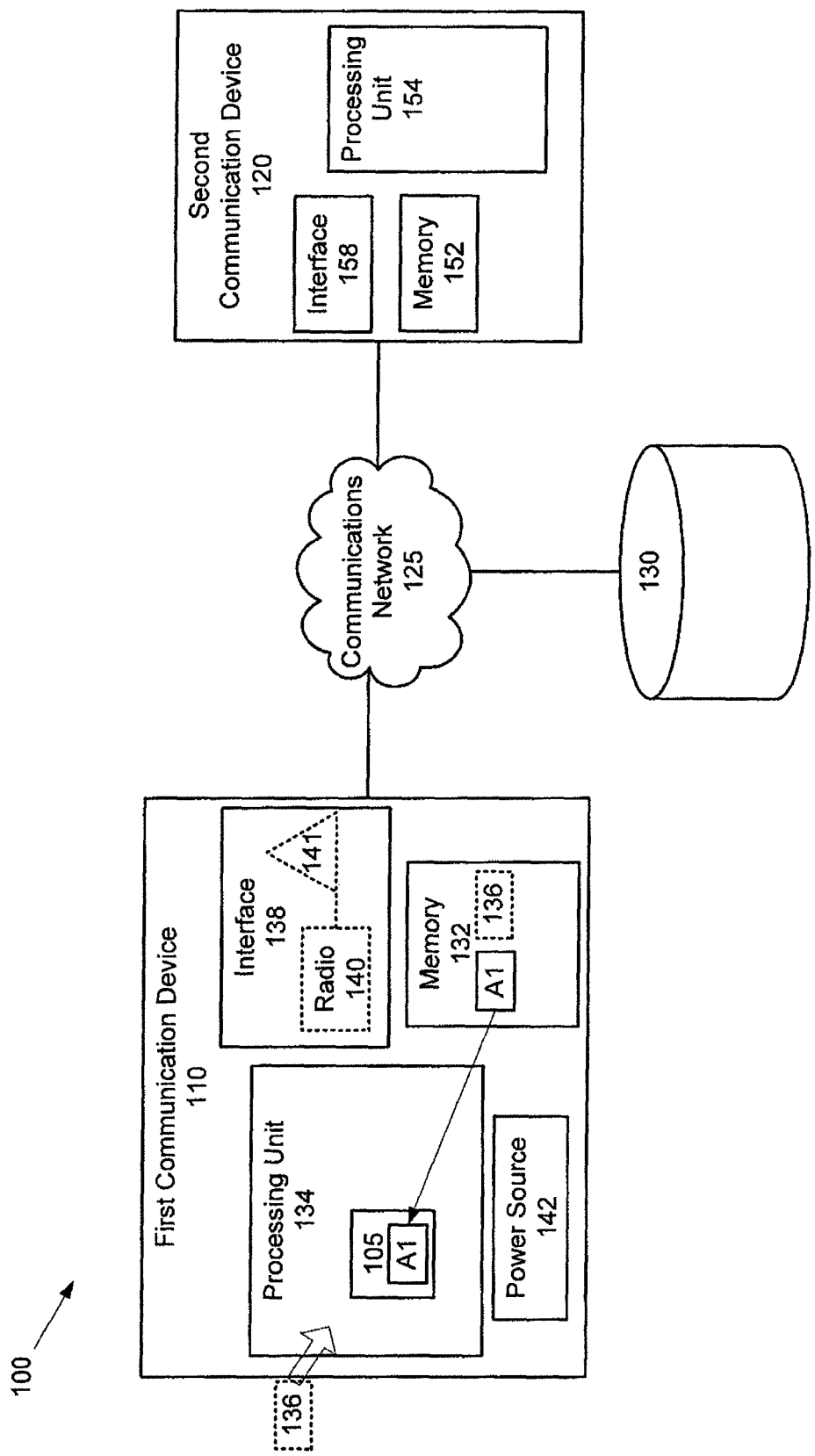
FIG. 1 depicts a system for processing data for transmission from a first communication device to a second communication device, according to non-limiting embodiments.

A first aspect of the present specification provides a method for processing data for transmission from a first communication device to a second communication device. The method comprises detecting that the data comprises an attachment. The method further comprises determining an address of a copy of the attachment present on a storage device external to the first and second communication devices. The method further comprises substituting the attachment with the address of the copy in the data such that the copy is retrievable at the second communication device via the address. The method further comprises transmitting the data to the second communication device.

The address can be embedded in the attachment, and determining the address of the copy can comprise processing the attachment to extract the address.

The attachment can comprise an exchangeable image file format (EXIF), and the address can be embedded in EXIF data.

The address can be stored in at least one of a database and a table in association with an identifier of the attachment, and determining the address of the copy can comprise processing at least one of the database and the table to retrieve the address via the identifier. The address can comprise a uniform resource locator (URL).

The method can further comprise: determining if the storage device is accessible to second communication device; and, if not, transmitting the data to the second communication device with the attachment attached thereto in lieu of the substituting. Determining if the storage device is accessible to the second communication device can comprise determining if the second communication device and the storage device are each associated with a same communication network. Determining if the storage device is accessible to the second communication device can comprise determining if there is a firewall between the second communication device and the storage device, and if so, determining that the storage device is not accessible to the second communication device.

The method can further comprise, prior to the detecting: uploading the copy of the attachment to the storage device; determining the address of the copy of the attachment; and, at least one of: storing the address in at least one of a database and a table in association with an identifier of the attachment, and embedding the address in the attachment.

The data can comprise at least one of an e-mail, a text-message, a short message service message and an instant messaging message, and the attachment can comprise at least one of image data, audio data, video data and document data.

A second aspect of the present specification provides a communication device for processing data for transmission from the communication device to a second communication device. The communication device comprises an interface enabled to transmit the data. The communication device further comprises a processing unit in communication with the interface. The processing unit is enabled to: detect that the data comprises an attachment; determine an address of a copy of the attachment present on a storage device external to the communication device and the second communication device; substitute the attachment with the address of the copy in the data such that the copy is retrievable at the second communication device via the address; and cause the data to be transmitted to the second communication device via the interface.

The address can be embedded in the attachment, and the processing unit can be further enabled to determine the address of the copy by processing the attachment to extract the address. The attachment can comprise an exchangeable image file format (EXIF), and the address can be embedded in EXIF data.

The communication device can further comprise a memory in communication with the processing unit, the memory enabled to store the address in at least one of a database and a table in association with an identifier of the attachment, and the processing unit can be further enabled to determine the address of the copy by processing at least one of the database and the table to retrieve the address via the identifier. The address comprises a uniform resource locator (URL).

The processing unit can be further enabled to: determine if the storage device is accessible to the second communication device; and, if not, cause the data to be transmitted to the second communication device, via the interface, with the attachment attached thereto in lieu of the substituting. The processing unit can be further enabled to determine if the storage device is accessible to the second communication device by determining if the second communication device and the storage device are each associated with a same communication network. The processing unit can be further enabled to determine if the storage device is accessible to the second communication device by determining if there is a firewall between the second communication device and the storage device, and, if so, determine that the storage device is not accessible to the second communication device.

The processing unit can be further enabled to, prior to detecting that the data comprises an attachment: upload the copy of the attachment to the storage device; determine the address of the copy of the attachment; and, at least one of: store the address in at least one of a database and a table in association with an identifier of the attachment, and embed the address in the attachment.

The data can comprise at least one of an e-mail, a text-message, a short message service message and an instant messaging message, and the attachment can comprise at least one of image data, audio data, video data and document data.

FIG. 1 depicts a system 100 for processing data 105 for transmission from a first communication device 110 to a second communication device 120. First communication device 110 is generally enabled to transmit data 105 to second communication device 120, via a communications network 125. Furthermore, first communication device 110 is enabled to transmit data 105 to second communication device 120. For example, data 105 can comprise at least one of an e-mail, a text-message, a short message service (SMS) message and an instant messaging (IM) message. Second communication device 120 is generally enabled to receive and process data 105.

System 100 comprises a storage device 130 external to first and second communication devices 110, 120. First and second communication device 110, 120 are generally enabled to communicate with storage device 130 via communications network 125. In general, first communication device 110 is enabled to upload data to storage device 130 for storage and/or backup and second communication device 120 is enabled to retrieve data from storage device 130.

First communication device 110 is further enabled to attach data A1 (hereafter referred to as attachment A1) to data 105, attachment A1 stored in a memory 132 prior to being attached to data 105. Attachment A1 can comprise at least one of image data, audio data, video data and document data, and the like, however it is understood that the nature of attachment A1 is not to be considered particularly limiting.

In some embodiments, first and second communication devices 110, 120 can comprise a personal computer, a laptop computer, a mobile communication device, a PDA, a cell-phone and/or a combination.

Communications network 125 can comprise any suitable combination of wired and wireless communication networks as desired, including but not limited to the Internet, an intranet, a WiFi network, a WiMax network, a cell-phone network, and a wireless data network.

First communication device 110 comprises a processing unit 134 for attaching attachment A1 to data 105. Processing unit 134 is further enabled to process data 105, according to a method described below with reference to FIG. 2, such that an address of a copy of attachment A1 is substituted for attachment A1. For example, processing unit 134 can implement such a method by processing a data transmission application (DTA) 136 which can be stored in memory 132, and retrieved by processing unit 134.

Processing unit 134 is further enabled to transmit a copy of attachment A1 to storage device 130, for back-up and/or storage, and to further determine an address of the copy, as described below.

Memory 132 comprises any suitable combination of random access memory (RAM) and read-only memory (ROM), as desired, and is enabled to store attachment A1, as well as applications such as DTA 136.

First communication device 110 further comprises a communication interface 138, which is generally compatible with communications network 125. In embodiments, where first communication device 110 comprises a mobile communication device, and communication network 125 comprises a wireless network, interface 138 comprises a radio 140 and an antenna 141. Interface 138 is generally enabled to transmit data 105 to second communication device 120 via communication network 125.

Processing unit 134 is generally in communication with memory 132 and interface 138, for example via a computer bus, such that attachment A1 can be retrieved from memory 132 and data 105 processed and transmitted via interface 138.

First communication device 110 further comprises a power source 142. However, in other embodiments, power source 142 can comprise a connector for connecting first communication device 110 to a source of power, such as a power outlet, and/or a combination of a battery and a connector.

Second communication device 120 comprises a memory 152, a processing unit 154 and an interface 158. Interface 158 is generally compatible with communication network 125 and is enabled to receive data 105 from first communication device 110 via communication network 125. Processing unit 154 is enabled to process data 105 upon receipt and memory 152 is enabled to store data 105 and/or data attached thereto. Processing unit 154 is further enabled to retrieve data from storage device 130, given an address of data stored at storage device 130.

First and second communication devices 110 and 120 can further comprise any suitable combination of input device(s) and display device(s), as desired (not depicted).

Figure 2:
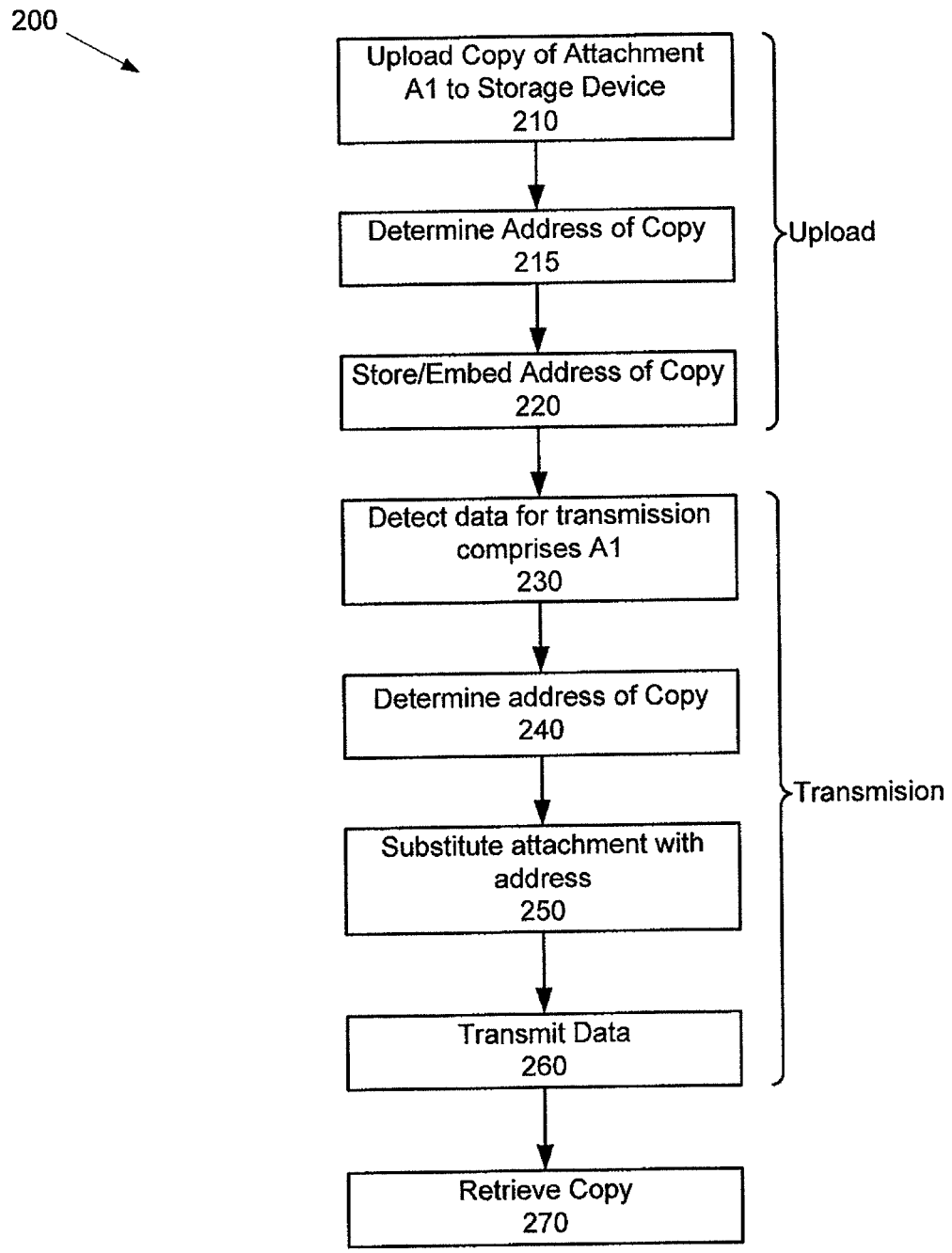
FIG. 2 depicts a method for processing data for transmission from a first communication device to a second communication device, according to non-limiting embodiments.

Attention is now directed to FIG. 2 which depicts a method 200 for processing data 105 for transmission from first communication device 110 to second communication device 120. In order to assist in the explanation of the method 200, it will be assumed that the method 200 is performed using the system 100. Furthermore, the following discussion of the method 200 will lead to a further understanding of the system 100 and its various components. However, it is to be understood that the system 100 and/or the method 200 can be varied, and need not work exactly as discussed herein in conjunction with each other, and that such variations are within the scope of present embodiments.

Prior to processing data 105 for transmission optional steps 210-220 can be performed such that a copy of attachment A1 is stored in storage device 130. However, it is understood that the means for storing a copy of attachment A1 in storage device 130 is not particularly limiting.

Figure 3:
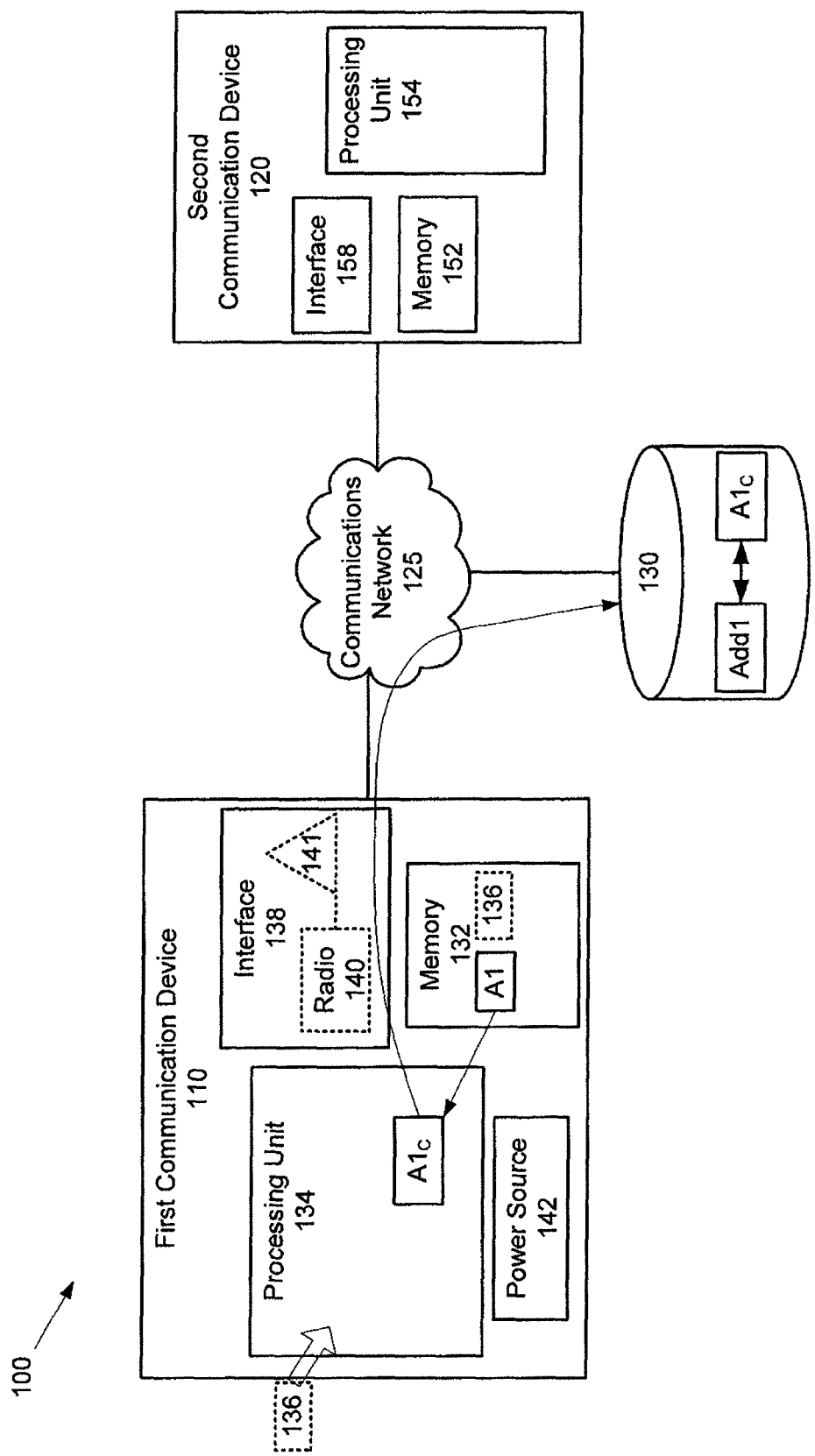
FIGS. 3 to 9 depict the system of FIG. 1 in operation, according to non-limiting embodiments.

At step 210, a copy $A1_C$ of attachment A1, which is stored in memory 132, is uploaded to storage device 130. For example, as depicted in FIG. 3 (substantially similar to FIG. 1 with like elements having like numbers) processing unit 134 can create copy $A1_C$ and transmit/upload copy $A1_C$ to storage device 130, via interface 138. At storage device 130, copy $A1_C$ is stored at an address Add1.

At step 215, address Add1 is determined at the processing unit 134. For example, during the upload process, processing unit 134 can receive address Add1 from storage device 130, as depicted in FIG. 4, either by requesting address Add1 from storage device 130 during the upload process and/or storage device 130 can transmit address Add1 to first communication device 110 once copy $A1_C$ is stored.

In some embodiments, address Add1 comprises a URL (Uniform Resource Locator: an address that specifies the location of a file on the Internet), and or a network address of the copy $A1_C$.

At step 220, processing unit 134 stores address Add1, by at least one of: storing address Add1 in a table T1 (and/or a database) in association with an identifier of said attachment, and embedding address Add1 in attachment A1.

Figure 4:
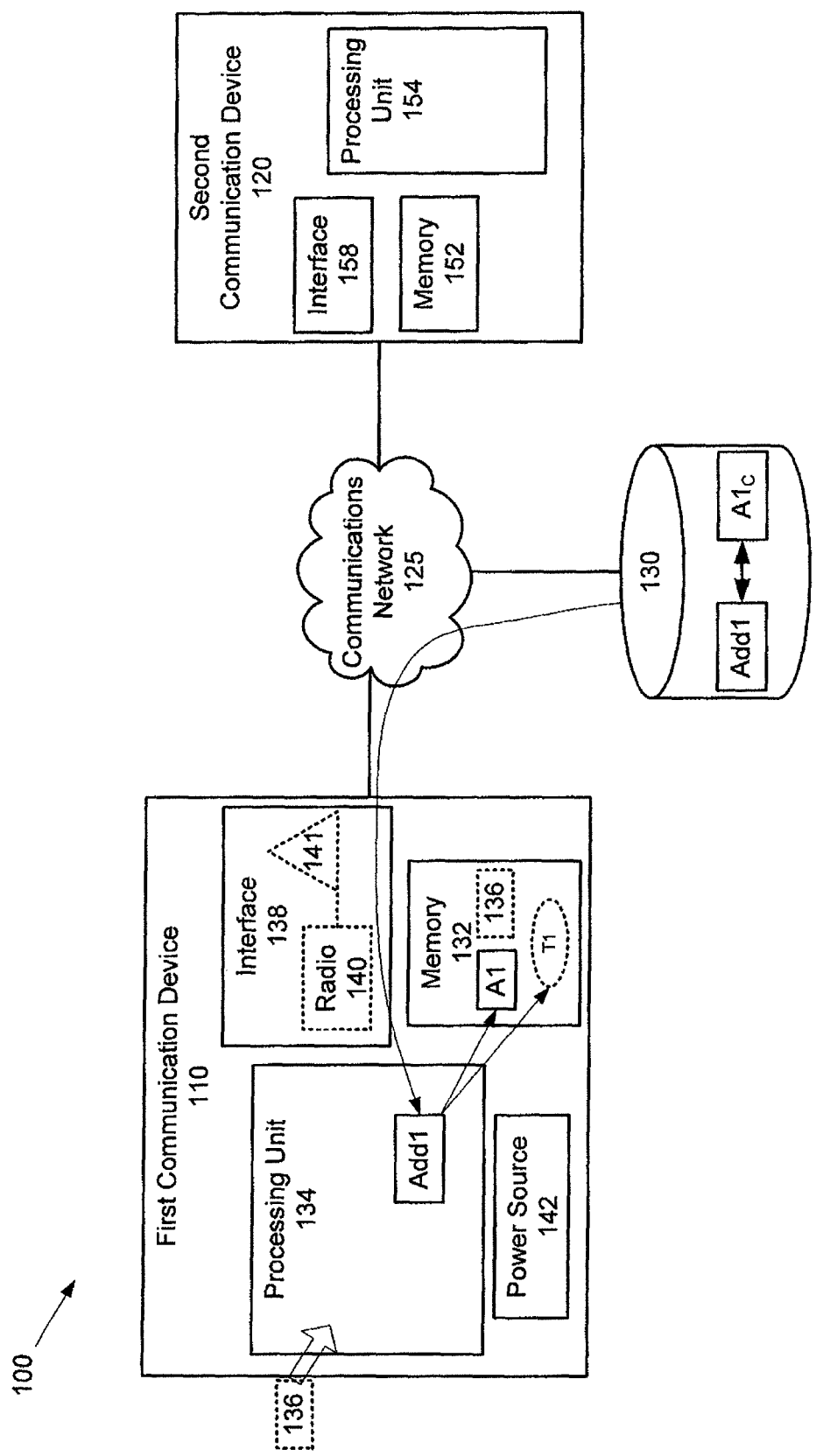

In embodiments which include table T1, table T1 can be stored in memory 132, as depicted in FIG. 4. In some non-limiting embodiments, table T1 can comprise:

TABLE T1

| Column 1: Data Identifier | Column 2: Address of copy of Data |
|---|---|
| Identifier of A1 | Add1 |

While the table T1 is presented in the format of rows and columns, it is understood that any suitable format can be used. In these embodiments, table T1 comprises a first data identifier column ("Data Identifier"), comprising an identifier of attachment A1. The identifier of attachment A1 can comprise any suitable identifier, including but not limited to a name of the attachment, an address of the attachment in the memory 132, a version number, a file identifier number, and/or a combination. For clarity, however, in table T1, the identifier of attachment A1 comprises "Identifier of A1". In these embodiments, table T1 further comprises a second column comprising the address of a copy of the data identified in the first column ("Address of copy of Data"), for example address Add1 of copy $A1_C$ (identified as "Add1" in table T1, for clarity).

Furthermore, table T1 can comprise any suitable number of rows, each comprising storing identifiers of respective data stored in memory 132, and addresses of copies associated with the respective data. For example, while present embodiments describe uploading only copy $A1_C$ to storage device 130, it is understood that copies of any number of respective data stored in memory 132 can be uploaded to storage device 130, and identifiers of respective data, along with addresses of copies associated with the respective data, can be stored in table T1.

Figure 5:
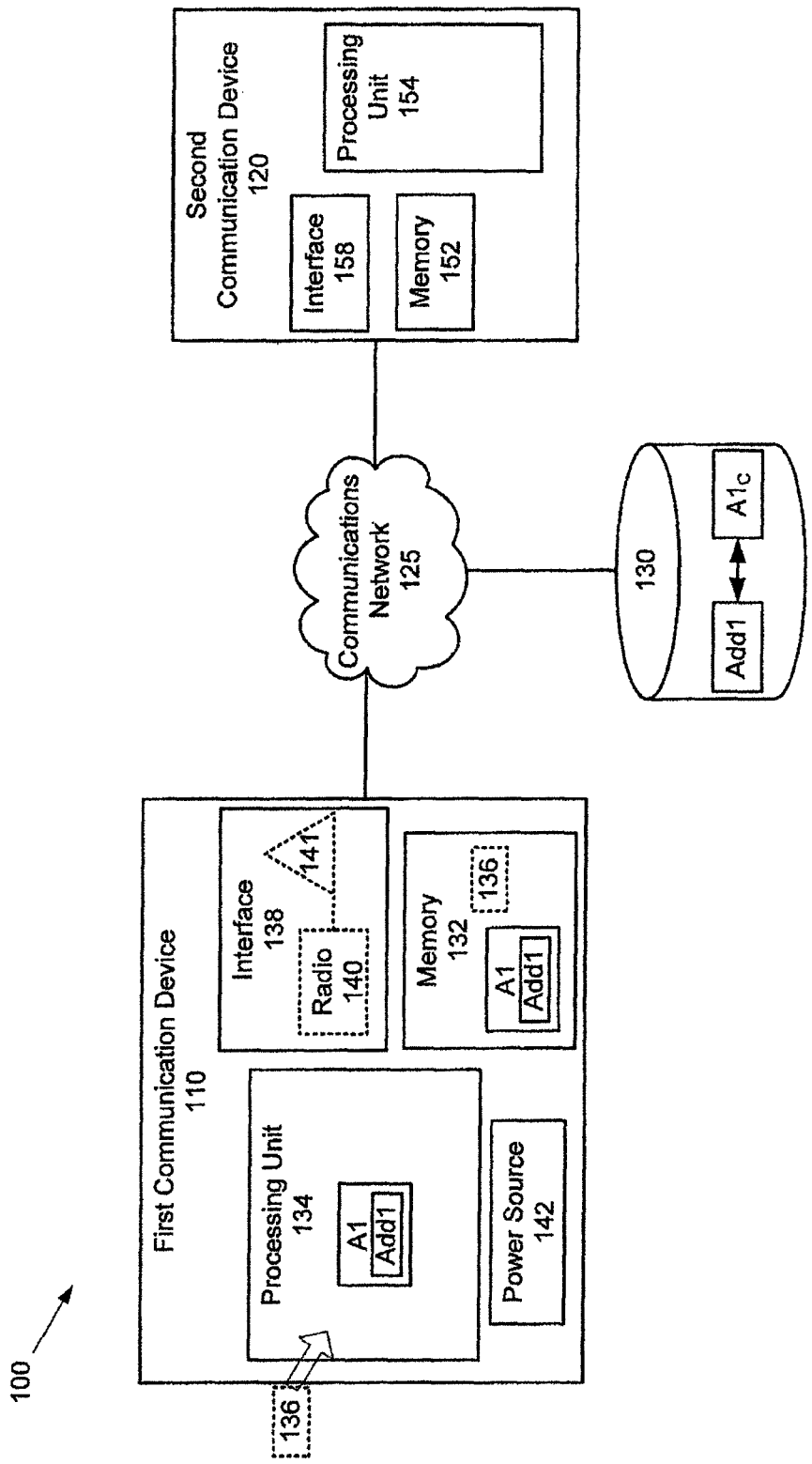
Figure 6:
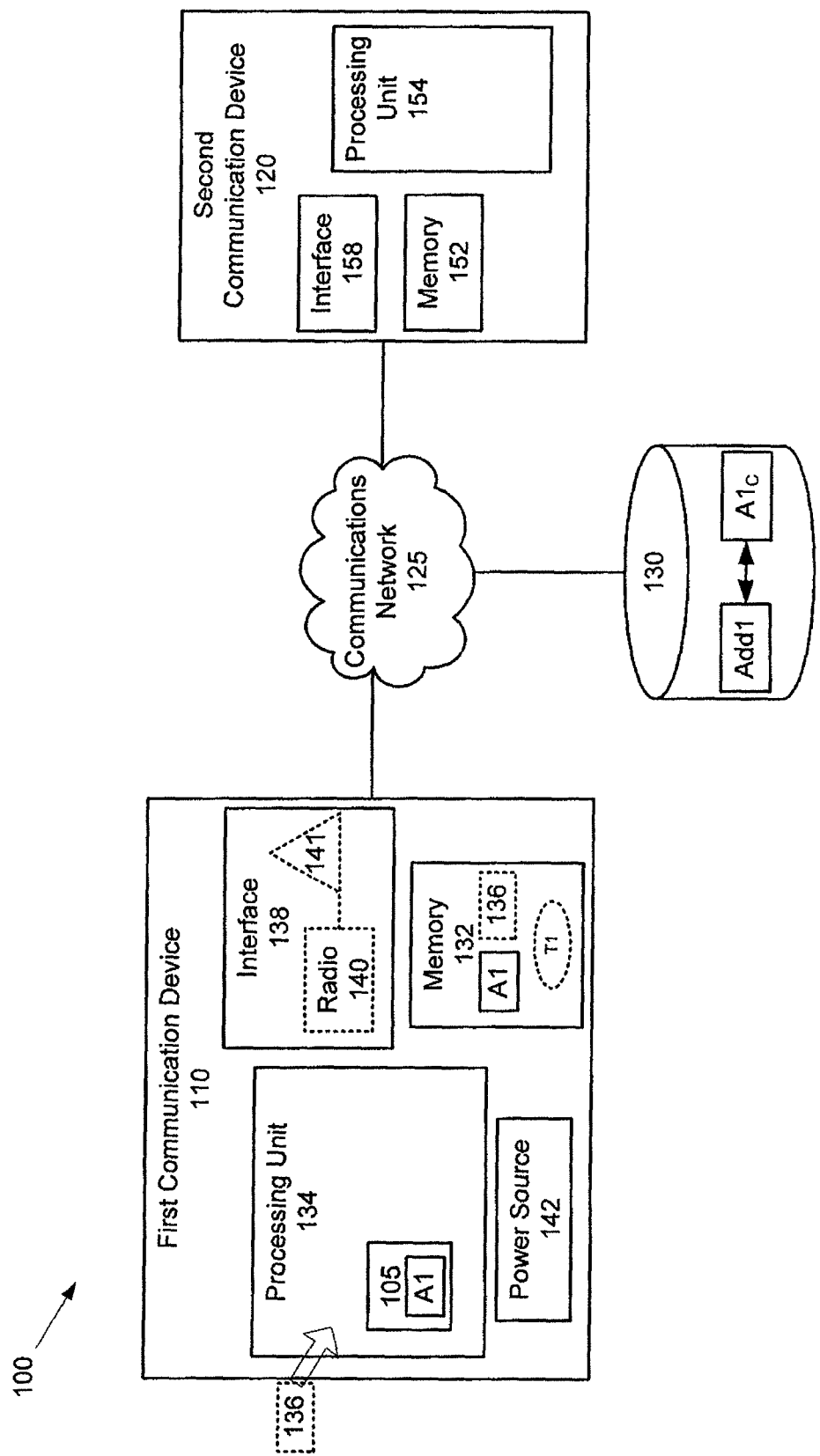

Alternatively, at step 220, address Add1 can be embedded in attachment A1, as depicted in FIG. 5, and stored in memory 132. For example, attachment A1 can comprise metadata, which generally describes attachment A1, and address Add1 can be embedded in the metadata. In exemplary embodiments, attachment A1 comprises an exchangeable image file format (EXIF), and address Add1 can be embedded in EXIF data. A non-limiting example of an exchangeable file format includes, but is not limited to a JPEG image, as known to persons of skill in the art. In further embodiments, where attachment A1 comprises EXIF data, EXIF data can include GPS data of where data was acquired (e.g. where a photo was taken), which can also be embedded in address Add1. For example, address Add1 can comprise a URL including the GPS data, which can later (e.g. at step 270 described below) be tied into a mapping application (such as Google Maps™) thereby providing further detail of where data was acquired when copy $A1c$ is later retrieved using address Add1.

In any event, it is understood that the means for storing a copy $A1_C$ in storage device 130 is not particularly limiting. In some alternative embodiments, a copy $A1_C$ can be stored in storage device 130 prior to attachment A1 being stored at first communication device 110. For example, attachment A1 can be transmitted to first communication device 110, by a third communication device (not depicted), which has already uploaded copy $A1_C$ to storage device 130, and embedded address Add1 in attachment A1, and/or transmitted address Add1 to first communication device 110.

In any event, at step 230, processing unit 134 detects that data 105 comprises attachment A1. It is generally understood that data 105 is to be transmitted to second communication device 120, and further that attachment A1 has been attached to data 105. It is further understood that while present exemplary embodiments are directed to one attachment, the number of attachments to data 105 is not to be considered particularly limiting.

In non-limiting embodiments, for example, an image file can be attached to an e-mail message. It is understood that data 105 can be generated via any suitable application, including but not limited to an e-mail application, a text message application, an SMS application and/or an IM application. It is furthermore understood that attachment A1 can be attached to data 105 in any suitable manner including, but not limited to, an automated e-mail application, drag and drop, file selection, etc.

At step 240, processing unit 134 determines address Add1 of copy $A1_C$ of attachment A1 present on storage device 130 external to first and second communication devices 110, 120. While in some embodiments, at optional step 215, address Add1 was previously determined; such a determination is performed during an upload/back-up process that is independent of step 240.

In any event, at step 240, in embodiments wherein address Add1 is embedded in attachment A1, determining address Add1 of copy $A1_C$ comprises processing attachment A1 to extract address Add1. In embodiments where address Add1 is stored in table T1 (and/or a database) in association with an identifier of attachment A1, determining address Add1 of copy $A1_C$ comprises processing table T1 (and/or a database) to retrieve address Add1 via the identifier. For example, attachment A1 can be processed to determine the identifier, and the identifier can be used to look up address Add1 in table T1.

Figure 7:
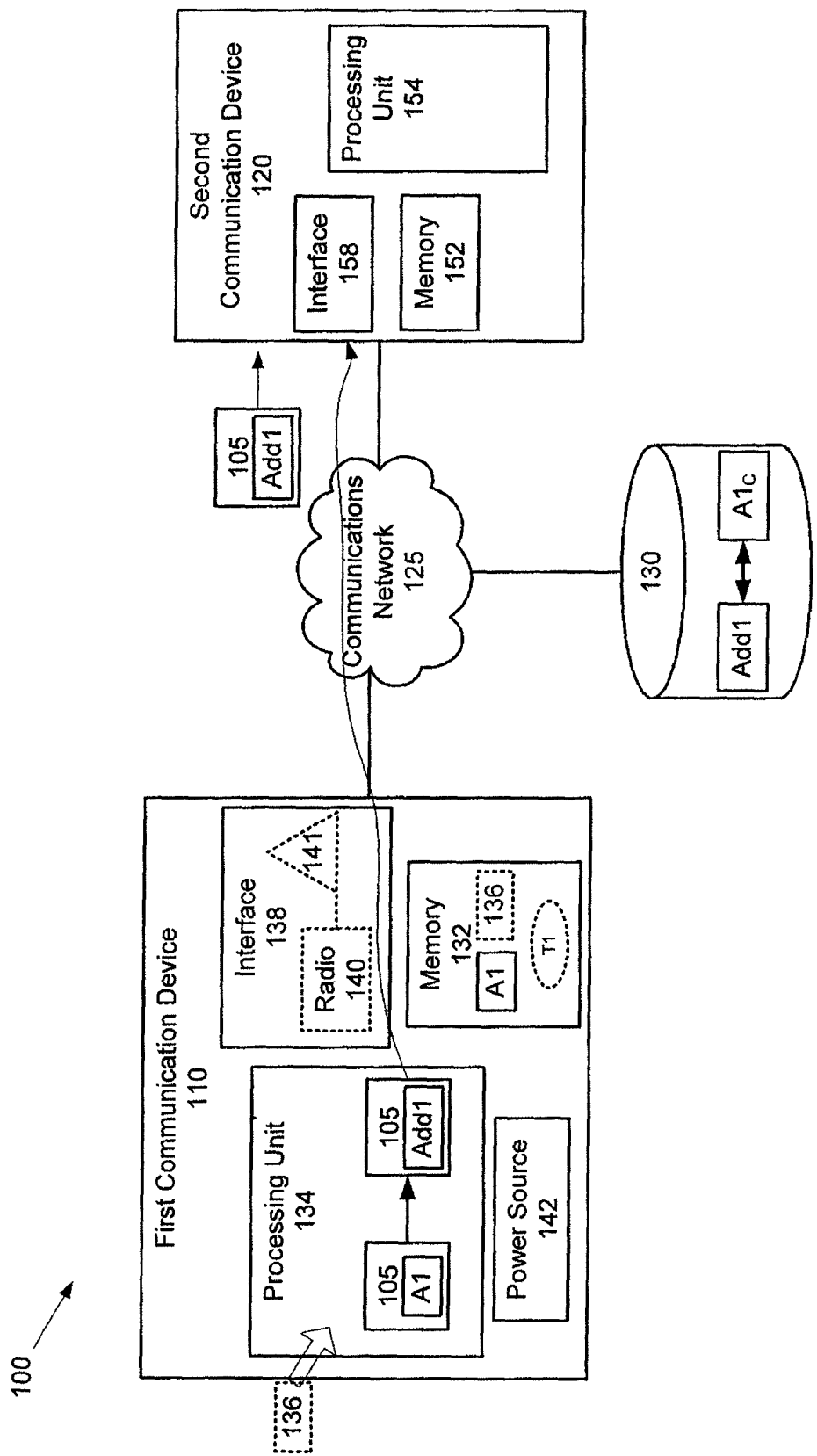

At step 250, and as depicted in FIG. 7, processing unit 134 substitutes attachment A1 with address Add1 of copy $A1_C$ in data 105, thereby reducing a size of data 105, such that copy $A1_C$ is retrievable at second communication device 120 via address Add1. In embodiments where data 105 comprises more than one attachment, respective addresses of copies of each respective attachment can be substituted for each respective attachment.

At step 260, data 105 is transmitted to second communication device 120, for example via interface 138 and communication network 125.

Figure 8:
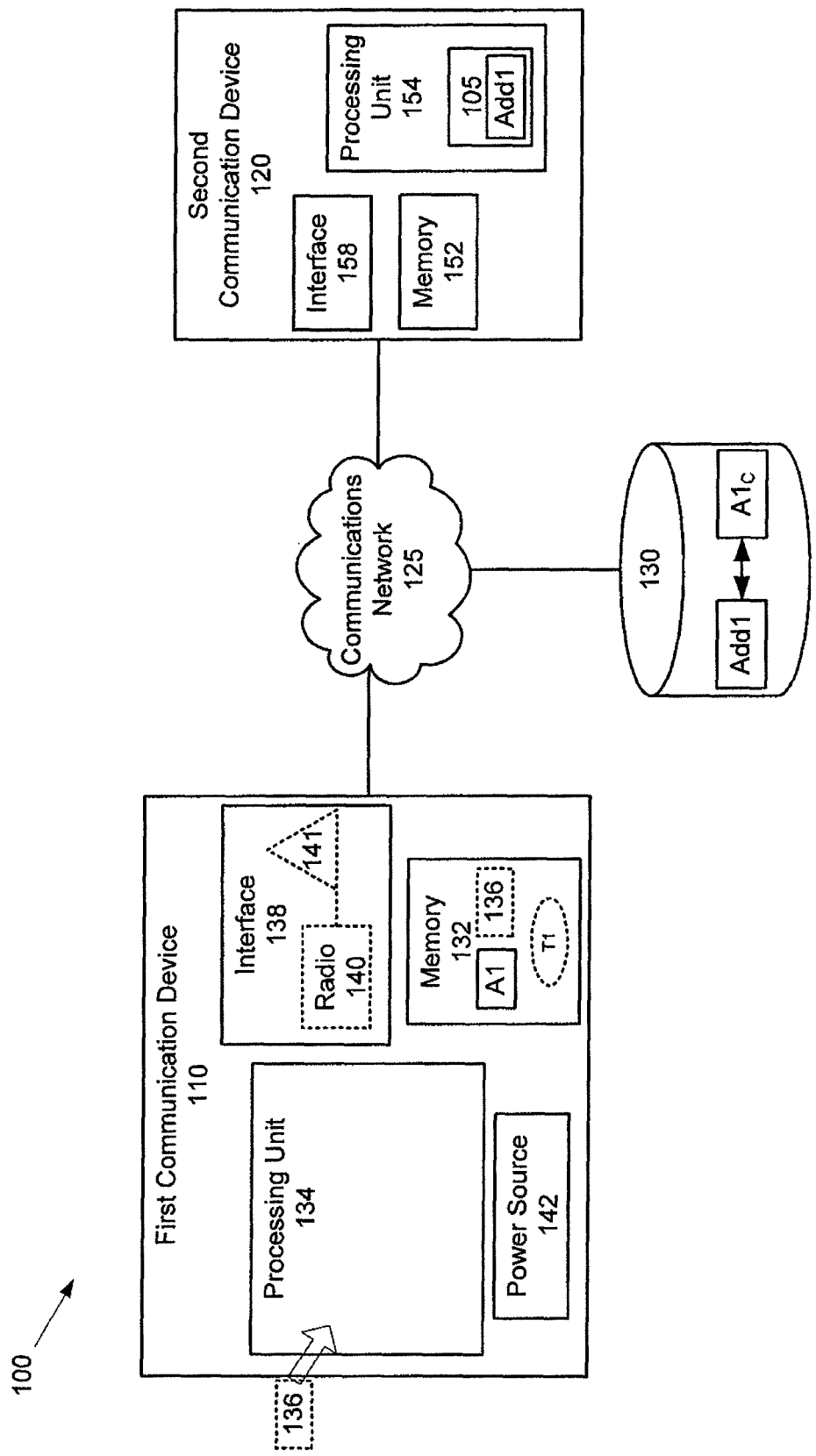
Figure 9:
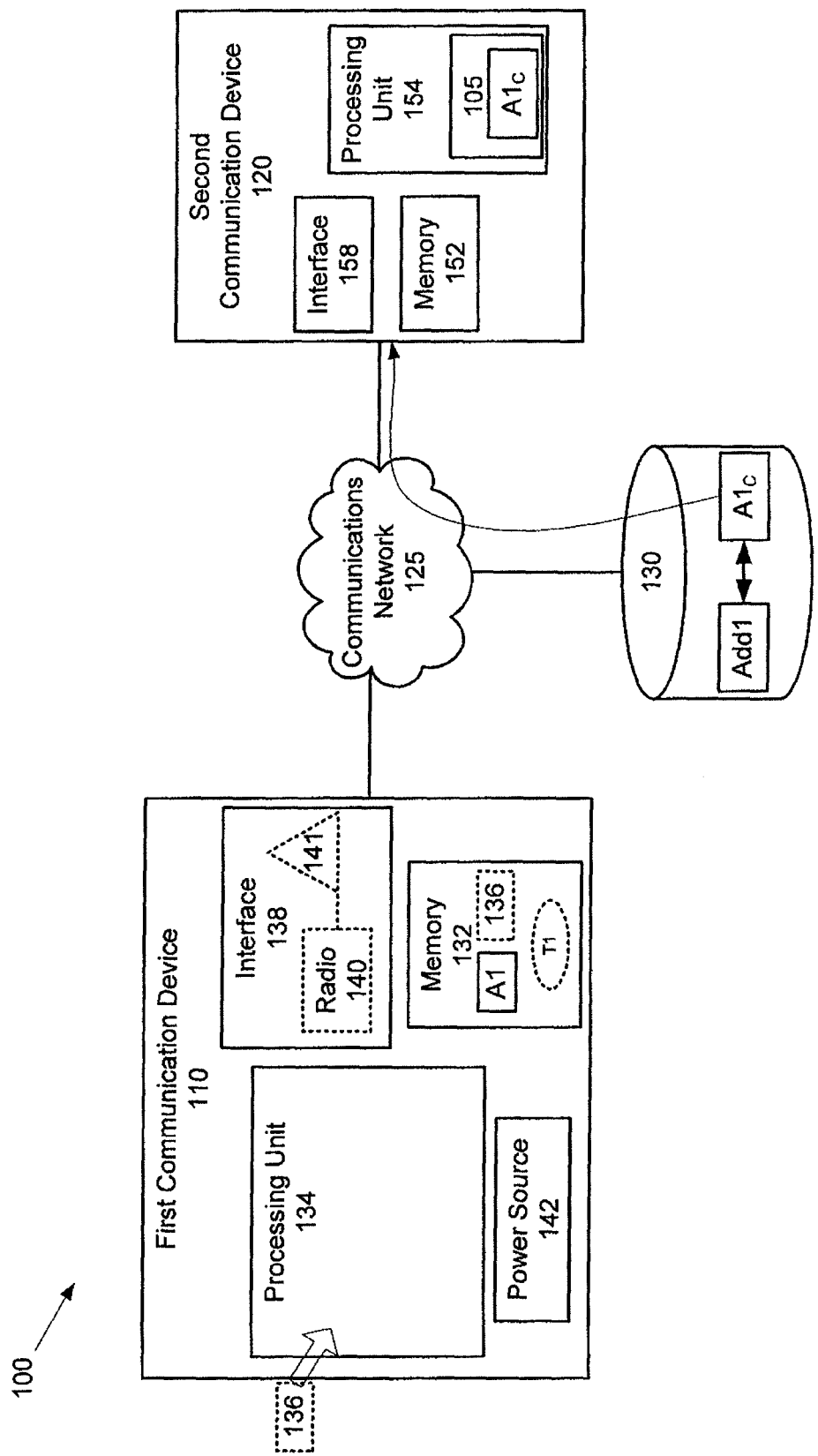

At step 270, copy $A1_C$ is retrieved at second communication device 120 via address Add1. For example, when data 105 arrives at second communication device 120, data 105 is processed by processing unit 154 to extract address Add1 (FIG. 8). In response, second communication device 120 then retrieves copy $A1_C$ (FIG. 9). In some embodiments, address Add1 is then substituted with copy $A1_C$ in data 105. In other embodiments, copy $A1_C$ can be retrieved and stored in memory 152 without performing a substitution. In yet further embodiments, copy $A1_C$ can be retrieved only upon receipt of data from an input device (not depicted), associated with second communication device 120 (e.g. an input device can be used to "click" on the address, when data 105 is displayed at a display device (not depicted)). In embodiments where address Add1 includes GPS data, further detail of copy $A1_C$ can be retrieved using the GPS data, for example via Google Maps™, or any other suitable mapping application.

Figure 10:
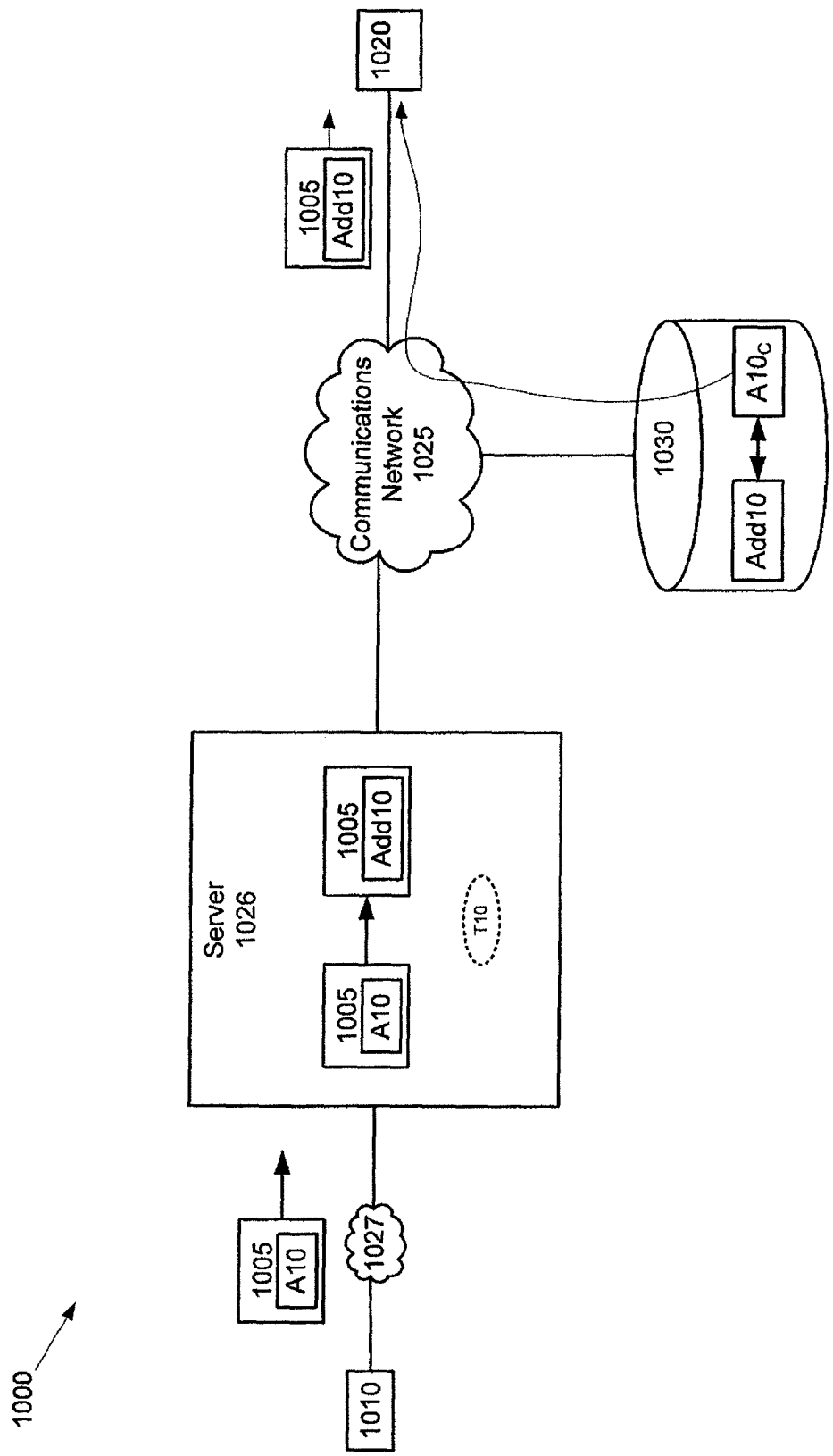
FIGS. 10 and 11 depict systems for processing data for transmission from a first communication device to a second communication device, according to non-limiting embodiments.

Attention is now directed to FIG. 10, which depicts an alternative embodiment of a system 1000 for processing data 1005 for transmission from a first communication device 1010 to a second communication device 1020. System 1000 is substantially similar to system 100, with like elements having like numbers, however preceded by a "10" rather than a "1". For example first communication device 1010 is similar to first communication device 110. However, system 1000 comprises a server 1026, such as an e-mail server, and the like, which is enabled to manage data transmitted (and/or received) by first communication device 1010. In these embodiments, server 1026 and first communication device 1010 are connected via a communication network 1027, which can be a wired or wireless communication network as desired, and can comprise an intranet, such as a company intranet. For example, server 1026 can be enabled to manage data transmitted and/or received by any given number of communication devices connected to server 1026 via communication network 1027.

Furthermore, while not depicted, it is understood that each communication device 1010 and 1020, and server 1026, comprises at least a processing unit, and a communications interface, similar to communication devices 110 and 120, and at least first communication device 1010 comprises a memory for storing an attachment A10, of which a copy $A10_C$ is stored at storage device 1030, at an address Add10. Furthermore, in some embodiments, server 1026 comprises a table T10 (and/or a database, e.g. stored in a memory), similar to table T1, however storing addresses of copies of any given number of attachments stored at any given number of communication devices connected to server 1026 via communication network 1027.

In any event, first communication device 1010 is enabled to transmit data 1005 comprising attachment A10 to second communication device 1020 via server 1026. Server 1026 is enabled to implement at least steps 230-260 of method 200, such that data 1005 is detected and address Add10 is substituted for attachment A10 in data 1005, as described above. Copy $A10_C$ can then be retrieved by second communication device 1020, as described above.

Figure 11:
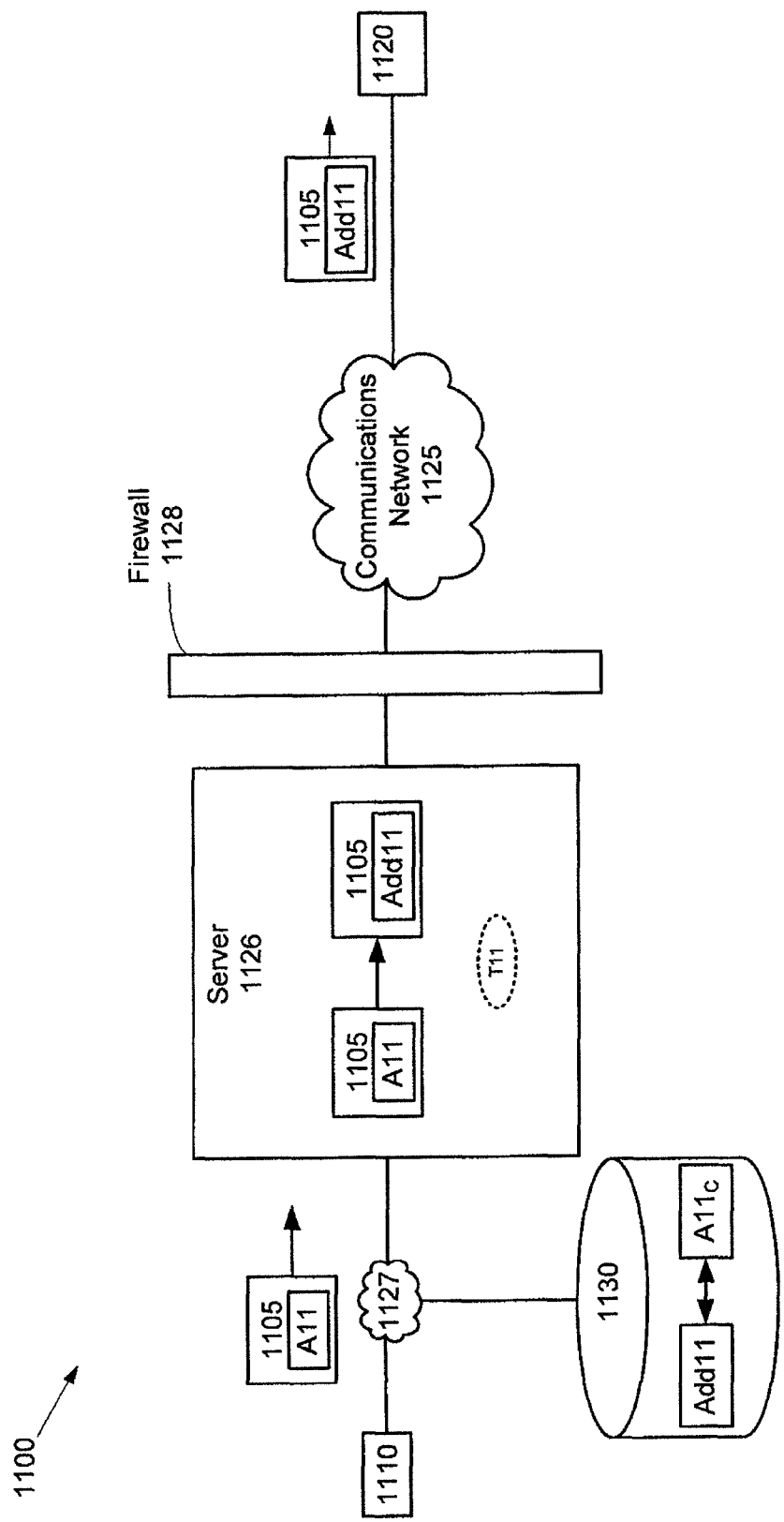

Attention is now directed to FIG. 11, which depicts an alternative embodiment of a system 1100 for processing data 1105 for transmission from a first communication device 1110 to a second communication device 1120. System 1100 is substantially similar to system 1000, with like elements having like numbers, however preceded by an "11" rather than a "10". For example first communication device 1110 is similar to first communication device 1010. However, system 1100 further comprises a firewall 1128, as known to a person of skill in the art. In these embodiments, storage device 1130 is in communication with first communication device 1110 and server 1126 via communication network 1127: in other words, in these embodiments, storage device 1130 is an element of an intranet. Furthermore, first communication device 1110, server 1126 and storage device 1130 are located "behind" firewall 1128, relative to second communication device 1120. Hence, in some of these embodiments, storage device 1130 is accessible to second communication device 1120, while in other embodiments storage device 1130 is not accessible to second communication device 1120.

Figure 12:
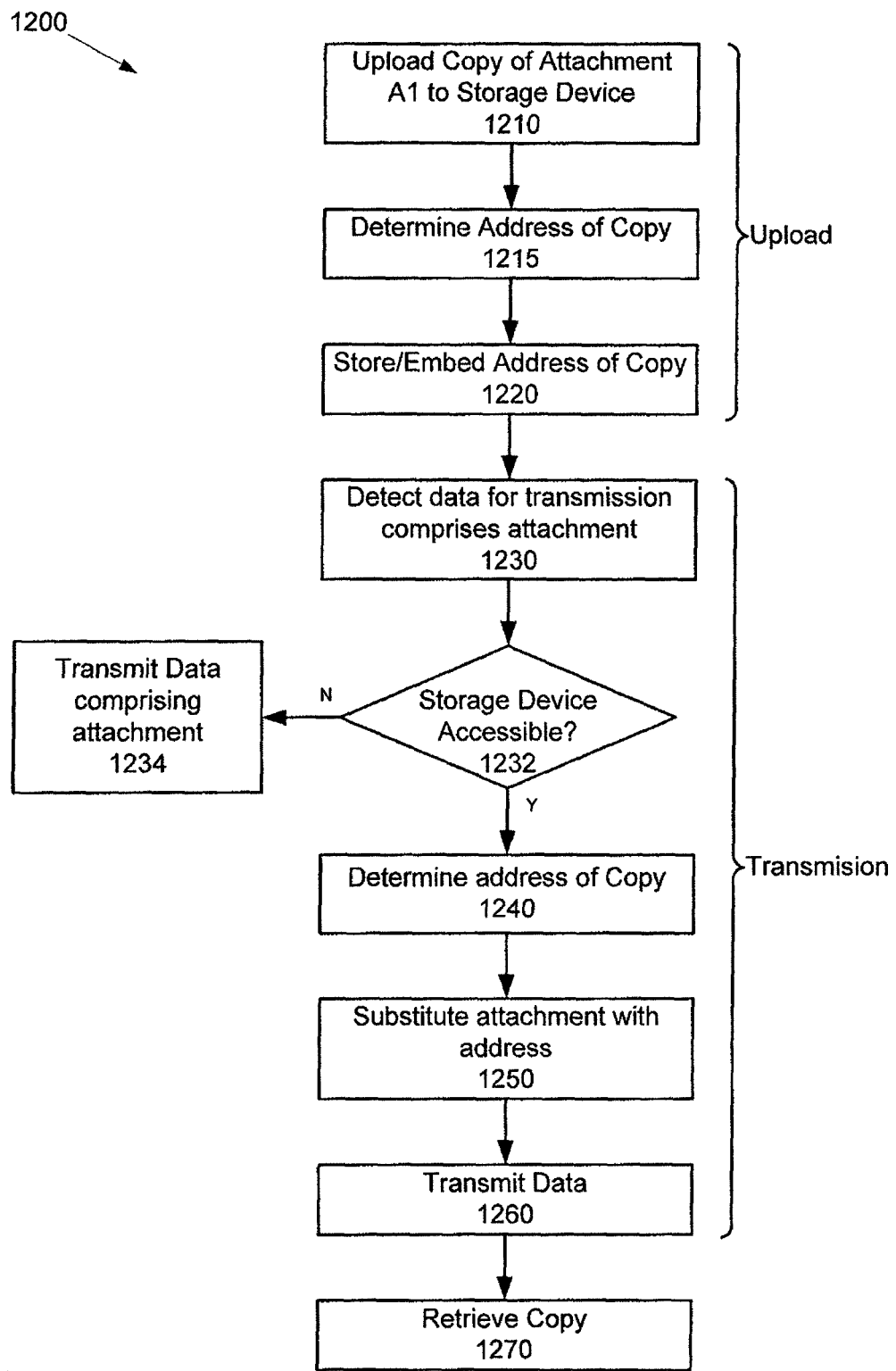
FIG. 12 depicts a method for processing data for transmission from a first communication device to a second communication device, according to non-limiting embodiments.

Attention is now directed to FIG. 12 which depicts a method 1200 for processing data 1105 for transmission from first communication device 1110 to second communication device 1120. In order to assist in the explanation of the method 1200, it will be assumed that the method 1200 is performed using the system 1100. Furthermore, the following discussion of the method 1200 will lead to a further understanding of the system 1100 and its various components. However, it is to be understood that the system 1100 and/or the method 1200 can be varied, and need not work exactly as discussed herein in conjunction with each other, and that such variations are within the scope of present embodiments. Method 1200 is substantially similar to method 200, with like steps having like numbers, however preceded by "12" rather than "2". For example, step 1230 is similar to step 230. Furthermore, steps 1230-1260 can be performed by first communication device 1110 and/or server 1126. In the following description, however, it will be assumed that steps 1230-1260 are implemented by server 1126.

In any event, after step 1230 (detect that data 1150 comprises attachment A11), at step 1232 a determination is made as to whether storage device 1130 is accessible to second communication device 1120. In some of these embodiments, server 1126 can determine whether storage device 1130 is accessible to second communication device 1120 by determining if second communication device 1120 and storage device 1130 are each associated with a same communication network: for example, in some embodiments, second communication device 1120 can also be located behind firewall 1128 (not depicted), and an element of communication network 1127. In these embodiments, second communication device 1120 is an element of the same intranet as first communication device 1110, etc. For example, server 1126 can maintain a list of all elements of communication network 1127.

Alternatively, determining if storage device 1130 is accessible to second communication device 1120 comprises determining if firewall 1128 is between second communication device 1120 and storage device 1130. For example, a query can be transmitted to the second communication device 1120, and if the reply passes through firewall 1128, it is determined that storage device 1130 is not accessible to second communication device 1120.

In another non-limiting alternative, determining if storage device 1130 is accessible to second communication device 1120 comprises processing the address of the second communication device 1120. For example server 1126 can comprise (and/or have access to) a list/table/database etc. of email domains and/or e-mail addresses that have access to storage device 1130.

Alternatively, determining if storage device 1130 is accessible to second communication device 1120 comprises determining if second communication device 1120 has permission to access storage device 1130 via firewall 1128. In these embodiments, a list of communication devices that have permission to access storage device 1130, but which are external to communication network 1127, can be maintained at server 1126 and/or firewall 1128 (and/or communication device 1110).

In any event, if storage device 1130 is accessible to second communication device 1120, then steps 1240-1260 are implemented (similar to steps 240-260, as described above), as depicted in FIG. 12.

However, if storage device 1130 is not accessible to second communication device 1120, then data 1105 is transmitted to second communication device 1120 with attachment A11 attached thereto in lieu of substituting attachment A11 with address Add11.

In any event, when an address of a copy of an attachment is substituted for an attachment, in data for transmission from an originating communication device to a receiving communication device, strain on resources at the originating communication device is reduced, as is the amount of bandwidth used in transmitting the data. This can further reduce the power used at the communication device and lengthen life of a battery, if present. Furthermore, if the receiving communication device has a limit on the size of attachments it can receive via e-mail etc., and if the data for transmission initially comprises an attachment larger than the limit, sub to which receive transmitted data can have limits on the size of attachments which can be accepted, and data which comprise an attachment that is of a size larger than the limit can be rejected, substitution of an address of a copy of the attachment can ensure that the data is not rejected.

The systems, methods and apparatus described herein can also be use to control access to data. For example, in some embodiments address Add1 (and/or Add10, Add11) can be transmitted instead of attachment A1 (and/or attachment A10, A11) to ensure that only authorized individuals gain access to copy A1c (and/or A10c, A11c). When second communication device 120 (and/or second communication device 1020, 1120) attempts to retrieve copy A1c (and/or A10c, A11c), control of access to copy A1c (and/or A10c, A11c) can be enforced via pre-existing permissions to access database 130 and/or database 1030, 1130. For example, in system 1100, server 1126 can rely on firewall 1128 (or another storage server with authenticated access) to enforce permissions.

Those skilled in the art will appreciate that in some embodiments, the functionality of communication devices 110, 120, 1010, 1020, 1110 and 1120, storage devices 130, 1030, 1130, and servers 1026 and 1126 can be implemented using pre-programmed hardware or firmware elements (e.g., application specific integrated circuits (ASICs), electrically erasable programmable read-only memories (EEPROMs), etc.), or other related components. In other embodiments, the functionality of communication devices 110, 120, 1010, 1020, 1110 and 1120, storage devices 130, 1030, 1130, and servers 1026 and 1126 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communication lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method comprising:
uploading, from an originating communication device to an external storage device, a copy of a file to be attached to a message, the uploading occurring prior to transmission of the message;
attaching, at the originating communication device, the file to the message
automatically substituting, at the originating communication device, in the message, the file with an address of the copy on the external storage device such that the copy of the file is retrievable at a receiving communication device using the address; and
transmitting, from the originating communication device to the receiving communication device, the message including the address but not the file.

2. The method of claim 1, further comprising: embedding the address in the file as metadata prior to the automatically substituting, the automatically substituting comprising processing the file to extract the address.

3. The method of claim 1, wherein the file comprises an exchangeable image file format (EXIF), and the address is embedded in EXIF data.

4. The method of claim 1, wherein the address comprises a uniform resource locator (URL).

5. The method of claim 1, further comprising:
determining if the external storage device is accessible; and, if not,
transmitting the message with the file attached thereto instead of the substituting.

6. The method of claim 5, wherein the determining if the external storage device is accessible comprises determining if the external storage device is accessible to the receiving communication device by at least one of:
determining if the external storage device and the receiving communication device are each associated with a same communication network; and
determining if there is a firewall between the receiving communication device and the external storage device, and if so, determining that the external storage device is not accessible to the receiving communication device.

7. The method of claim 1, further comprising
at least one of:
storing the address in at least one of a database and a table in association with an identifier of the file; and
embedding the address in the file.

8. The method of claim 1, wherein the message comprises at least one of an e-mail, a text-message, a short message service message and an instant messaging message, and the file comprises at least one of image data, audio data, video data and document data.

9. The method of claim 1, wherein the address is stored in association with an identifier of the file in at least one of a database and a table, and the substituting the file with the address of the copy on the external storage device comprises processing at least one of the database and the table to retrieve the address via the identifier.

10. An originating communication device comprising:
a communication interface;
a processing unit configured to:
upload, using the communication interface, town external storage device, a copy of a file to be attached to a message, uploading of the copy occurring prior to transmission of the message;
automatically substitute, in the message, the file with an address of the copy on the external storage device such that the copy of the file is retrievable at a receiving communication device using the address; and
transmit, using the communication interface, to the receiving communication device, the message including the address but not the file.

11. The originating device of claim 10, wherein the processor is further configured to embed the address in the file as metadata prior to automatically substituting the file with the address, the automatically substituting comprising processing the file to extract the address.

12. The originating device of claim 10, wherein the file comprises one or more of: an exchangeable image file format (EXIF), and the address is embedded in EXIF data; and a uniform resource locator (URL).

13. The originating device of claim 10, wherein the processor is further configured to:
determine if the external storage device is accessible; and, if not,
transmit the message with the file attached thereto instead of the substituting.

14. The originating device of claim 13, wherein the processor is further configured to determine if the external storage device is accessible by determining if the external storage device is accessible to the receiving communication device by at least one of:
determining if the external storage device and the receiving communication device are each associated with a same communication network; and
determining if there is a firewall between the receiving communication device and the external storage device, and if so, determining that the external storage device is not accessible to the receiving communication device.

15. The originating device of claim 14, wherein the processor is further configured to
at least one of:
store the address in at least one of a database and a table in association with an identifier of the file; and
embed the address in the file.

16. The originating device of claim 10, wherein the message comprises at least one of an e-mail, a text-message, a short message service message and an instant messaging message, and the file comprises at least one of image data, audio data, video data and document data.

17. The originating device of claim 10, wherein the address is stored in association with an identifier of the file in at least one of a database and a table, and the substituting the file with the address of the copy on the external storage device comprises processing at least one of the database and the table to retrieve the address via the identifier.

18. A non-transitory computer-readable medium storing a computer program, wherein execution of the computer program is for:
uploading, from an originating communication device to an external storage device, a copy of a file to be attached to a message, the uploading occurring prior to transmission of the message;
attaching, at the originating communication device, the file to the message
automatically substituting, at the originating communication device, in the message, the file with an address of the copy on the external storage device such that the copy of the file is retrievable at a receiving communication device using the address; and
transmitting, from the originating communication device to the receiving communication device, the message including the address but not the file.

19. The non-transitory computer-readable medium of claim 18, wherein execution of the computer program is further for: embedding the address in the file as metadata prior to the automatically substituting, the automatically substituting comprising processing the file to extract the address.

* * * * *